United States Patent [19]

Sinnar

[11] Patent Number: 4,675,031
[45] Date of Patent: Jun. 23, 1987

[54] PHORETIC ENHANCED-GRAVITY PARTICULATE REMOVAL SYSTEM

[76] Inventor: Abbas M. Sinnar, 10076 Shaker Dr., Columbia, Md. 21046

[21] Appl. No.: 766,969

[22] Filed: Aug. 19, 1985

[51] Int. Cl.⁴ .............................................. B01D 53/26
[52] U.S. Cl. ............................................ 55/81; 55/93; 55/220; 55/222; 55/269; 55/354; 261/80; 261/152
[58] Field of Search ............... 55/81, 90, 91, 93, 94, 55/354, 220, 222, 228, 233, 240, 267–269; 261/80, 153, 154, 152

[56] References Cited

U.S. PATENT DOCUMENTS

| 3,324,630 | 6/1967 | Teller et al. | 55/90 |
|---|---|---|---|
| 3,395,510 | 8/1968 | Barnes | 55/94 |
| 3,957,464 | 5/1976 | Teller | 55/94 |
| 4,284,609 | 8/1981 | de Vries | 55/94 |
| 4,345,916 | 8/1982 | Richards | 55/94 |
| 4,364,750 | 12/1982 | Koncz | 55/94 |
| 4,497,641 | 2/1985 | Brown et al. | 55/94 |

FOREIGN PATENT DOCUMENTS

| 320292 | 2/1972 | U.S.S.R. | 55/91 |
|---|---|---|---|
| 738642 | 6/1980 | U.S.S.R. | 55/94 |

Primary Examiner—Bernard Nozick
Attorney, Agent, or Firm—Morton J. Rosenberg

[57] ABSTRACT

A phoretic enhanced-gravity particulate removal system (10) is provided for removing particulates and gaseous pollutants from a particulate laden gas. The particulate laden gas is initially brought into a housing (12) between a plurality of upper and lower planar members (20 and 22). The facing surfaces of the planar members (20 and 22) provide for a temperature gradient. The particulate laden gas is driven through a saturation zone in a gas flow channel (26) formed by the planar members (20 and 22). The particulates begin to nucleate and grow at a rapid rate due to supersaturation provided by the temperature gradient and the wetting of the facing surfaces of the planar members (20 and 22). The growth is rapid and causes the nucleating particulates to be driven in a path (58) towards a capturing mechanism (38) through phoretic and gravity forces. Increased nucleation rate and growth of the nucleating particles allow for a maximization of the amount of particulates captured and removed from the housing (12).

26 Claims, 3 Drawing Figures

PHORETIC ENHANCED-GRAVITY PARTICULATE REMOVAL SYSTEM

BACKGROUND OF THE INVENTION

1. Field of the Invention

This invention pertains to the removal of particulate matter from particulate laden gases. In particular, this invention directs itself to the cleansing of waste gases which are the products of combustion containing particulates and gaseous pollutants. Still further, this invention directs itself to a system and method for removing particulates from waste gases which is capable of removing particulates in the micron and less range which may result from a number of processes such as coal combustion. Additionally, the subject invention is directed to a system and method wherein phoretic forces are used in combination with gravity to capture particulates from a waste gas. Still further, the subject invention is directed to a system and method wherein the particulate matter in the waste gas is driven through a zone of sustained supersaturation, and thus accelerating the nucleation and growth of particulate matter. Rapid growth of submicron particles enhances the action of gravitational force which in combination with phoretic forces drives the particulate matter to a capturing mechanism for removal from the system.

2. Prior Art

Removal of particulate matter from waste gases has been a continuing concern in industry for a number of years. Particle removing systems and methods for removing such particles from waste gases are known in the prior art.

In some prior art systems wet scrubbers are used for removal of particulate matter from waste gases. Generally, such prior art scrubbers are able to attain high collection efficiencies if sufficient energy is applied to the gas and liquid contacting process. However, it has been found that energy costs increase at a very high rate with the decrease in particle size below approximately 3.0 microns. Due to the increased cost of removing fine particulates, work has been directed to particle growth by water condensation in a number of systems such as spray or steam preconditioners and in other wet scrubbing systems.

Some projects have been initiated to investigate the potential of flux force condensation in order to reduce power requirements for fine particulate removal. The particle growth due to water vapor condensation and the collection enhancement by thermophoretic and diffusiophoretic forces are currently being sought in the condenser/wet scrubber from the cooling of hot, humid waste gases by contact with cold water. However, such flux force condensation scrubbing systems do not provide for supersaturation which is necessary for the nucleation of certain water insoluble submicron particles to take place. Such prior systems do not employ sustained supersaturation for the nucleation and growth of fine particulates in the nucleation process.

The closest prior art known to the applicant from a search made at the U.S. Patent and Trademark Office is U.S. Pat. No. 4,497,641. This reference directs itself to a system and method for dust control by condensation enlargement. Thus, particles are enlarged from sizes less than 1 micron to larger sizes by nucleation. This prior art reference system uses a plurality of hot and cold plates where hot water covers the surface of the sides of the hot plates and travels in a downward direction across the surface of the plates. Heaters are used to enhance evaporation and as water evaporates such diffuses across the distance between the hot and cold plates where it contacts the cool surface of the cold plates. The condensation of the water and the dust particles are received at the bottom of an overall housing. However, although such system does use to some extent phoretic forces, such does not provide for the sustained supersaturation concept of the subject invention in combination with the combined phoretic and gravity forces necessary to the subject invention concept.

Other prior art known to the applicant include U.S. Pat. Nos. 3,912,469; 4,141,701; 3,852,409; 3,852,408; 4,272,499; 3,894,851; 3,218,047; 4,375,976; 4,153,432; 4,290,783; 4,193,774; 467,264; 495,359; 3,966,438; 3,696,590; and 2,935,375. None of these references provide for the concept of sustained supersaturation in combination with phoretic and gravity forces for capturing the nucleating particulate matter.

SUMMARY OF THE INVENTION

A phoretic enhanced gravity particulate removal system for expunging particulates and gaseous pollutants from a particulate laden gas. The particulate removal system includes a mechanism for saturating the particulate laden gas for providing a substantially saturated particulate laden gas. Additionally, a mechanism for supersaturating the substantially saturated particulate laden gas is provided for promoting nucleation and growth of particulate matter in supersaturated particulate laden gas. A mechanism for capturing the nucleated particles then removes such nucleated particles from the overall system.

DESCRIPTION OF THE PREFERRED EMBODIMENTS

Figure 1:
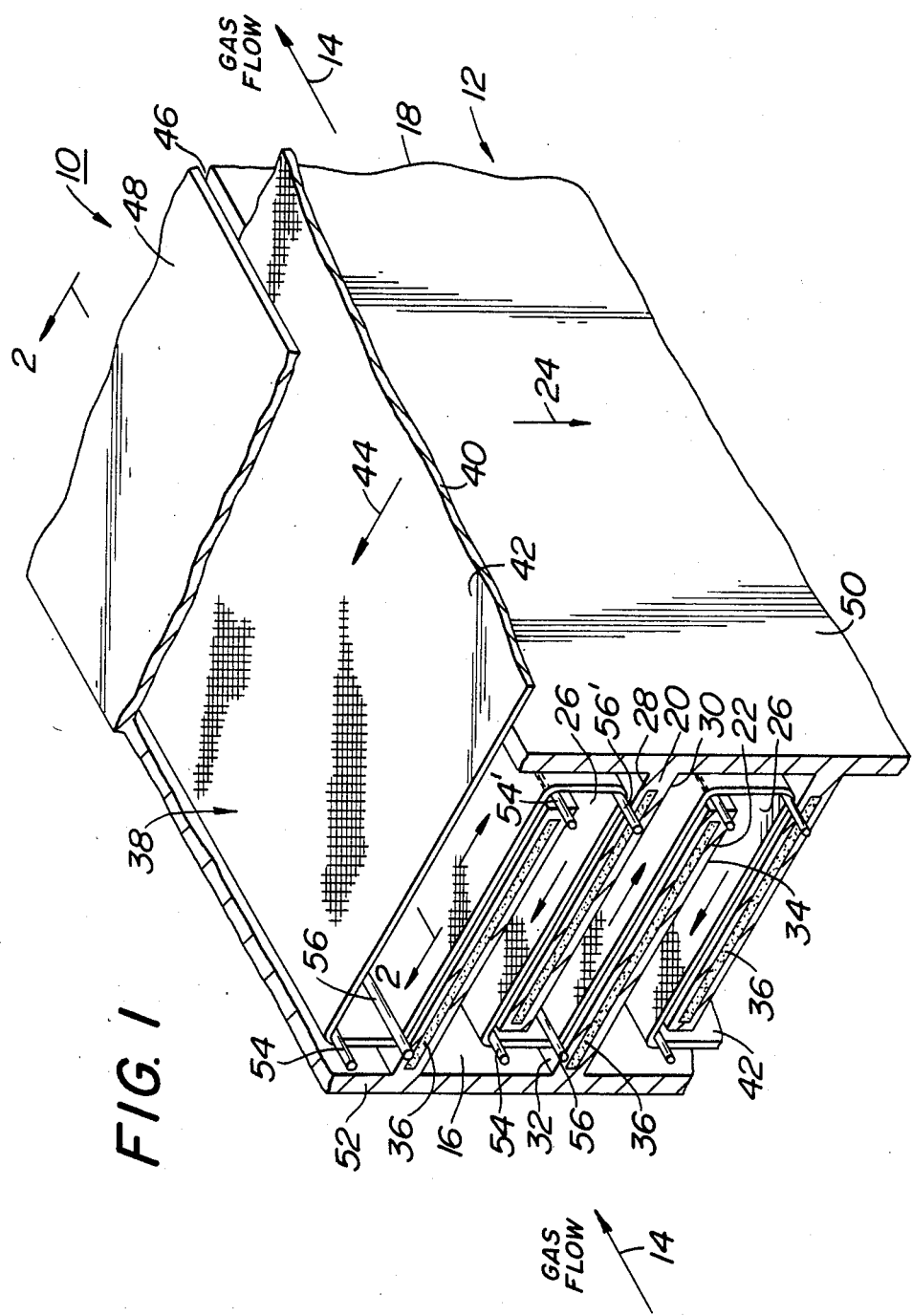
FIG. 1 is a schematic view of the particulate removal system shown partially in cutaway.
Figure 2:
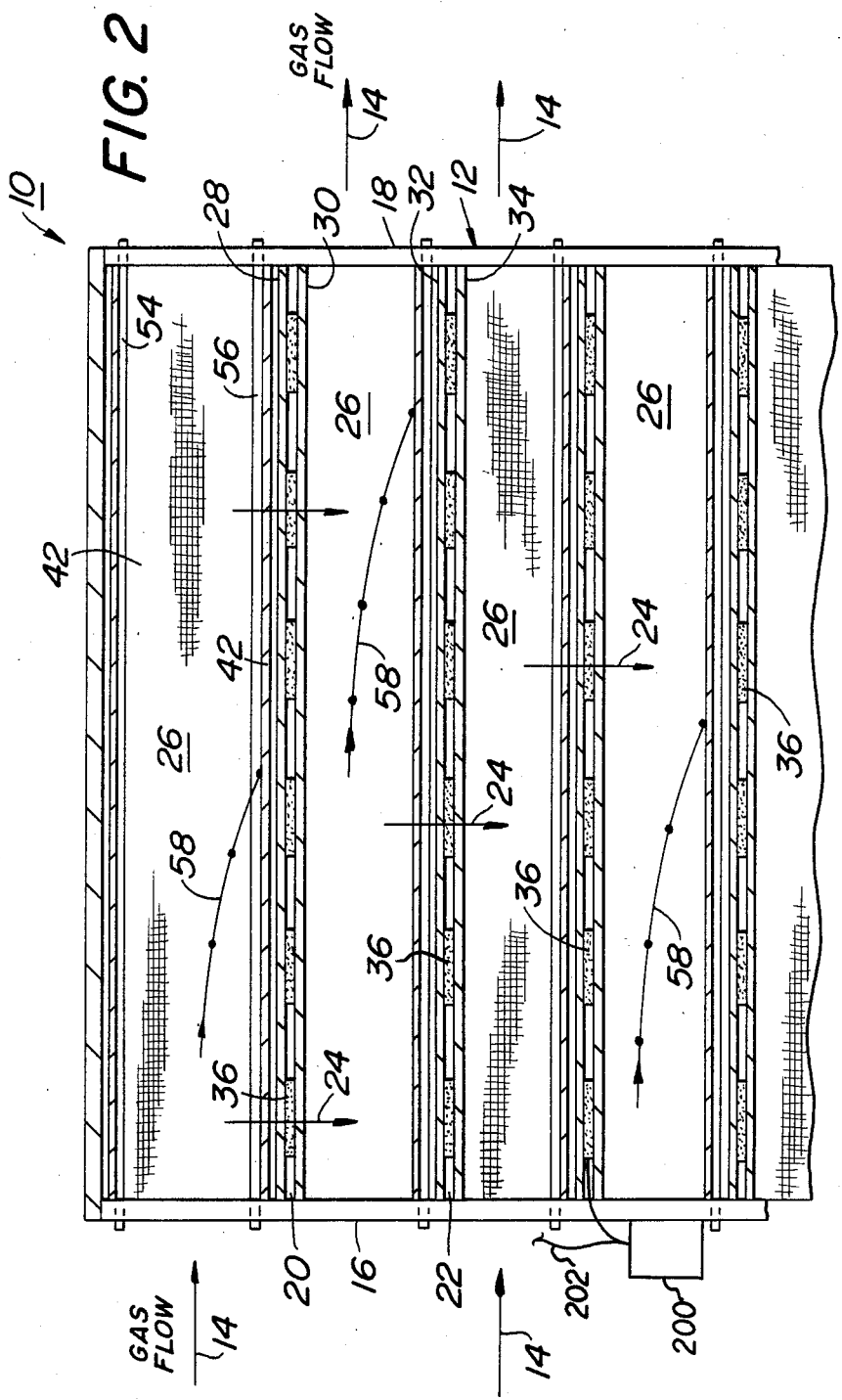
FIG. 2 is a sectional view of the particulate removal system taken along the section lines 2—2 of FIG. 1; and, FIG. 3 is a perspective view of particulate removal system.

Referring now to FIGS. 1 and 2 there is shown phoretic enhanced-gravity particulate removal system 10 for expunging particulates and gaseous pollutants from a particulate laden gas stream. In overall concept, particulate removal system 10 utilizes supersaturation to accelerate the nucleation and growth of particulate matter in the particulate laden gas. Additionally, phoretic forces are applied to the nucleating particles which combine with gravitational assist forces to drive the nucleating particles to a capturing mechanism which then removes the particulate matter from the gas stream. A major problem in prior art systems in the field of removal of particles from gas streams has been found in the micron and sub-micron particle range. Where particles are found in the micron and sub-micron range, nucleation has been found to be a relatively slow process and does not efficiently permit capturing of such particulate matter for removal from a flowing gas stream. It has now been found through the use of phoretic enhanced-gravity particulate removal system 10 that by supersaturating the particulate laden gas nucleation may be enhanced and once rapid growth has been initiated, gravity action is enhanced in the driving of such growing particles to a capturing mechanism to be described in following paragraphs.

Figure 3:
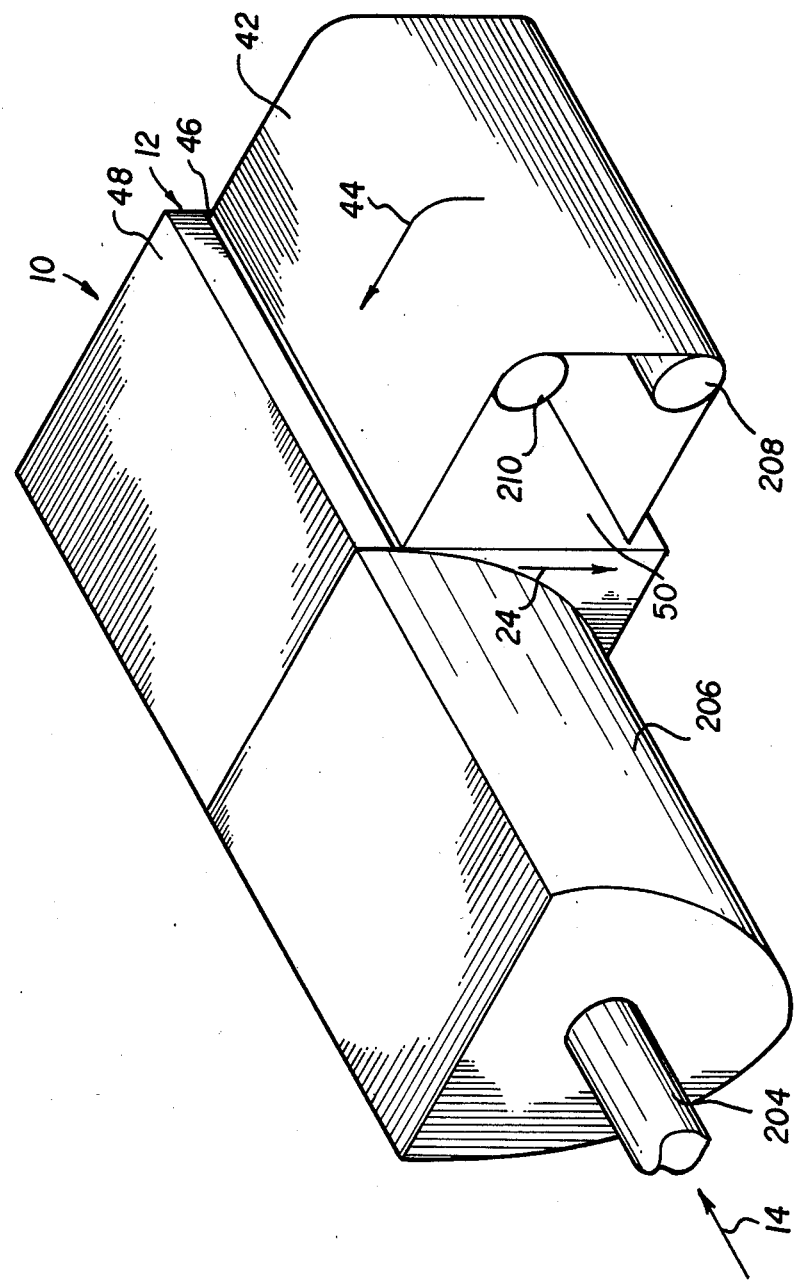

Referring now to FIG. 1 there is shown housing 12 through which particulate laden gas flows in gas flow direction 14. Prior to entrance into housing 12, the particulate laden gas is inserted into and passed through a commercially available water saturating mechanism 206 by inlet pipe 204 as shown in FIG. 3 to saturate the waste or particulate laden gases. Saturating mechanism 206 is of conventional design and is used to at least substantially saturate the particulate laden gas as well as to lower its temperature to an acceptable level, not important to the inventive concept as herein described, however, such temperature reduction generally brings the gas from several hundred degrees C. to less than 70° C.

Phoretic enhanced-gravity particulate removal system 10 further includes a mechanism for supersaturating the substantially saturated particulate laden gas entering housing 12 for promoting nucleation and subsequent growth of particulate matter present in the particle laden gas. Housing 12 includes housing inlet 16 for entrance thereto of the substantially saturated particulate laden gas and housing outlet 18 for egress of cleansed gas substantially reduced in particulate composition when taken with respect to the substantially saturated particulate laden gas entering housing 12 through inlet 16. System 10 includes at least first planar member 20 and second planar member 22 secured to opposing housing side walls 50 and 52 as is shown in FIG. 1. First and second substantially planar members 20 and 22 are substantially rigid in construction and extend substantially throughout the length of housing 12 in the directional gas flow 14. Although a number of substantially planar members may be used in construction of system 10 as herein described, it is to be understood that each pair of substantially planar members will operate in substantially the same manner as those to be described for substantially planar members 20 and 22. The pair of first and second substantially planar members 20 and 22 are additionally displaced each from the other in the direction of gravity vector 24 shown in FIG. 2 and are generally substantially parallel each with respect to the other.

First and second planar members 20 and 22 through their vertical displacement each with respect to the other define gas flow channel 26 through which the particulate laden gas flows in gas flow direction 14 as is shown. Thus, it is clearly seen that the particulate laden gas passing within gas flow channel 26 is directed in a direction substantially normal to gravitational vector 24.

First substantially planar member 20 includes upper and lower surfaces 28 and 30 respectively. Similarly, second substantially planar member 22 includes upper surface 32 and lower surface 34 as is shown in both FIGS. 1 and 2. In order to promote supersaturation of gas flowing within gas flow channels 26, lower surface 30 of first planar member 20 is maintained at higher temperature than upper surface 32 of second planar member 22 and both these surfaces are also maintained wetted by a liquid such as water. In this manner supersaturation of gas flowing within channel 26 is promoted to at least provide for supersaturation of the incoming saturated particulate laden gas intenral to housing 12. The degree of supersaturation is controlled by varying the temperature difference between the lower surface 30 and the upper surface 32, and the supersaturation in channel 26 increases with any increase in this temperature difference. Specific temperatures of upper surface 32 and lower surface 30 are maintained below and above the temperature for the mean gas channel temperature. For particulate laden gas flowing through gas flow channels 26 and for purposes of example only, where such gas is flowing at a mean temperature of 60 degrees C., it has been found that a temperature difference between surfaces 32 and 30 of approximately 22 degrees C. has produced substantially increased nucleation and growth of submicron particles due to the effect of supersaturation.

System 10 also includes means for applying phoretic forces to the substantially saturated particulate laden gas within gas flow channels 26. There exists both thermophoretic and diffusiophoretic forces acting in the direction of gravitational vector 24 away from the heated surfaces and toward the cooler surfaces. For particulates smaller than approximately 1.0 microns in diameter, the phoretic force component is dominant and the phoretic force propels such small particles either to the regions of desired supersaturation within gas flow channel 26 or to a capturing mechanism to be described in following paragraphs.

In order to maintain the temperature differences between surfaces 30 and surfaces 32 it is of importance to provide a temperature control mechanism which will provide a temperature difference across each planar member 20 and 22 in the direction of gravity vector 24. Thus, due to the fact that a plurality of gas flow channels are provided by respective planar members 20 and 22 in a stacked condition as shown in FIGS. 1 and 2, upper surfaces 28 and 32 of adjacent planar members 20 and 22 are maintained at a lower temperature than lower surfaces 30 and 34 of respective substantially planar members 20 and 22.

In order to accomplish this thermodynamic phenomenon, thermoelectric units 36 are mounted within first and second planar members 20 and 22 for maintaining respective upper surface temperatures less than respective lower surface temperatures. Actuation of thermoelectric units 36 are provided by standard thermoelectric control box 200 electrically coupled to units 36 through leads 202. Thermoelectric units of this type are well known in the art and are commercially available for incorporation into phoretic enhanced-gravity particulate removal system 10. One such thermoelectric unit 36 which is commercially available is manufactured by Cambridge Thermionic Corporation Model #801-2003-01/02-00-00.

As previously described, all surfaces such as for example 28, 30, 32 and 34 must be wetted to aid in supersaturation. This wetting may be accomplished in a wide variety of ways such as providing planar members, 20 and 22 as porous members fed by an external liquid supply (not shown), not important to the inventive concept as herein described with the exception that the surfaces are maintained in a wetted condition.

Thus, the particles within gas flow channel 26 are forced to a capturing mechanism by a combination of phoretic forces applied to the particles as well as enhanced-gravity due to the fact that the nucleating particles being subjected to sustained supersaturations, are growing at a rapid rate. The combined effect of the phoretic forces and gravity on the nucleating and growing particles, increases the rapid displacement of the nucleating particulates in the direction of gravity vector 24.

Phoretic enhanced-gravity particulate removal system 10 further includes capturing mechanism 38 for capturing particles and includes a mechanism for removing the particles from housing 12. Capturing mechanism 38 may include a conveyor system 40 which is displaceable substantially in a direction normal to gas flow direction 14 and in a plane substantially parallel to the gas flow direction. As can be seen, conveyor mechanism 40 includes sheet member 42 which is transported in direction 44.

Sheet member 42 may extend external to housing 12 and is displaceably moved in direction 44 through opening 46 formed between side wall 50 and housing upper structural member 48. Although not important to the inventive concept, sheet member 42 may be externally driven by rollers 208 and 210. Sheet member 42 passes in a direction 44 to an area adjacent housing side wall 52. Sheet material 42 passes around roller 54 and then extends downwardly to pass around lower roller 56. Sheet or webbed material 42 then extends in a transverse direction to gas flow direction 14 to pass around roller members 54' and 56' as shown in FIG. 1. This provides for a zig-zag or undulating contour for the movement of sheet material 42 as it passes around substantially planar members 20 and 22.

As can be clearly seen, sheet material 42 is thus mounted adjacent upper surface 28 of first planar member 20 and passes to upper surface 32 of second substantially planar member 22. Roller members 54 and 56 as well as 54' and 56' rollingly engage sheet or webbed material 42 in its path through housing 12. Sheet material 42 then may exit at a lower end of housing 12 as is shown in FIG. 1.

As has been previously described, supersaturation occurs within system 10 and particles through combined phoretic and gravity forces are driven in a path described by particle path lines 58 on FIG. 2. As is seen, particle path 58 terminates in webbed or sheet material 42 where the particulate matter is captured. As webbed or sheet material 42 passes through housing 12, the entrained particulate matter is responsively carried external to housing 12 for removal therefrom. Sheet material 42 may be a fabric material having an affinity for adherence of particulate matter entrained thereon. Additionally, sheet material 42 may be formed into an endless belt which is continuously removed from a lower end of housing 12 and inserted into an upper portion of housing 12 as has herein been described. In this manner, a sheet or webbed material 42 may be cleansed prior to insertion into housing 12.

Sheet material 42 may be driven through housing 12 by actuation of roller members 54, 56 or combinations thereof or in the alternative may be externally driven. The method of driving sheet material 42 through housing 12 is not important to the inventive concept as herein described with the exception that such be continuously moved or displaced through housing 12 in the manner described in order to allow removal of particulate matter entrained thereon.

Phoretic enhanced-gravity particulate removal system 10 provides for a method of removing particulates from a particulate laden gas entering housing 12 in gas flow direction 14. Initially, the particulate laden gas is passed in a direction substantially normal to gravity vector 24 within gas flow channel 26 of housing 12. Prior to the insertion into one or more gas flow channels 26 formed within housing 12, the particulate laden gas may be at least partially saturated through the use of a commercially available water saturating system.

Within gas flow channel 26, the particulate laden gas being treated is at least partially supersaturated within gas flow channels 26 by driving such gas into a zone of sustained supersaturation. The step of supersaturating the particulate laden gas includes the steps of maintaining wetted opposing vertically displaced flow channel surfaces 30 and 32 of respective planar members 20 and 22 mounted within housing 12 and extending as well as being coupled to opposing sidewalls 50 and 52. The step of supersaturating the particulate laden gas further includes providing a temperature difference between lower surface 30 and upper surface 32 which may be accomplished by thermoelectric generators 36 mounted within planar members 20 and 22.

The movement of the particle laden gas into a zone of sustained supersaturation then provides for nucleation and growth of particulates within the particulate laden gas.

Due to the fact that both surfaces of channel 26 are wet and at different temperatures, both thermophoretic and diffusiophoretic forces are applied to the particulates in the direction of gravity vector 24. Gravity force plays a dominant role as the nucleated particles, subjected to sustained supersaturation, rapidly grow out of submicron range.

The particulates traveling a path such as 58 are then captured by capturing mechanism 38 for removal from housing 12. The nucleated particulates adhere to sheet or webbed material 42 which is conveyed through housing 12 in an undulating manner around a plurality of planar members 20 and 22 as has been previously described.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as described in the appended claims.

What is claimed is:

1. A method of removing particulates from a particulate laden gas, including the steps of:

(a) passing said particulate laden gas in a direction substantially normal a gravity vector within a flow channel;

(b) wetting members forming said flow channels with a liquid;

(c) at least partially supersaturating said particulate laden gas within said flow channel;

(d) nucleating particulates within said at least partially supersaturated particulate laden gas;

(e) growing nucleated particles within said supersaturated particle laden gas;

(f) applying a predetermined temperature gradient in a direction substantially coincident with said gravity vector, said temperature gradient providing a decreasing temperature in the direction of said gravity vector; and, (g) capturing said nucleated and grown particles to be removed from said particulate laden gas, said step of capturing including the step of displaying said nucleated and grown particles toward a capturing means through a combination of phoretic and gravity assist forces acting thereon.

2. The method of removing particulates from a particulate laden gas as recited in claim 1 where the step of passing said particulate laden gas is preceded by the step of at least partially saturating said particulate laden gas.

3. The method of removing particulates from a particulate laden gas as recited in claim 1 where the step of at least partially supersaturating said particulate laden gas includes the steps of wetting and maintaining at different temperatures opposing vertically displaced flow channel surfaces between which said particulate laden gas passes.

4. The method of removing particulates from a particulate laden gas as recited in claim 1 where said step of capturing said nucleated particulates is followed by the step of removing said captured particulates from said flow channel.

5. The method of removing particulates from a particulate laden gas as recited in claim 4 where the step of removing said captured particulates includes the step of adhering said nucleated particulates to an adhering sheet of material.

6. The method of removing particulates from a particulate laden gas as recited in claim 5 where the step of adhering is followed by the step of conveying said sheet external said flow channel.

7. The method of removing particulates from a particulate laden gas as recited in claim 1 including the step of applying phoretic forces to said particulate laden gas passing in said flow channel.

8. The method of removing particulate from a particulate laden gas as recited in claim 7 where the step of capturing said nucleated particles includes the step of combining (1) said phoretic forces, and (2) gravity forces applied to said nucleated particles.

9. The method of removing particulates from a particulate laden gas as recited in claim 7 where the step of applying phoretic forces to said particulate laden gas includes the steps of maintaining a predetermined temperature difference between an upper surface and a lower surface of said gas flow channel, and maintaining said upper and lower surfaces of said gas channel in a wetted condition.

10. The method of removing particulates from a particulate laden gas as recited in claim 9 where said predetermined temperature difference is applied in a direction substantially parallel said gravity vector.

11. A phoretic enhanced-gravity particulate removal system for expunging particulates and gaseous pollutants from a particulate laden gas, comprising:
(a) means for saturating said particulate laden gas for providing a substantially saturated particulate laden gas;
(b) means for supersaturation said substantially saturated particulate laden gas for promoting nucleation and growth of said supersaturated particle laden gas to provide growing particles, said means for supersaturating including members being wetted by liquid to aid in supersaturating said particulate laden gas; and,
(c) means for capturing said growing particles, said growing particles initially passing in a direction substantially normal a gravity vector and having a predetermined temperature gradient applied thereto in a direction substantially coincident with said gravity vector, said temperature gradient providing a decreasing temperature in the direction of said gravity vector, said growing particles being displaced to said capturing means by a combination of phoretic and gravity assist forces.

12. The phoretic enhanced-gravity particulate removal system as recited in claim 11 where said means for supersaturating includes:
(a) a housing having an inlet for entrance thereto of said substantially saturated particulate laden gas, and an outlet therefrom for egress of a cleansed gas substantially reduced in particulate composition when taken with respect to said substantially saturated particle laden gas; and,
(b) at least a first and second pair of substantially planar members secured to said housing and defining a gas flow channel extending substantially from said housing inlet to said housing outlet, said particulate laden gas passing within said gas flow channel in a direction substantially normal to a gravitational vector.

13. The phoretic enhanced-gravity particulate removal system as recited in claim 12 where each of said first and second substantially planar members includes an upper and a lower surface, said lower surface of said first planar member being vertically displaced and facing said upper surface of said second planar member for defining said gas flow channel therebetween.

14. The phoretic enhanced-gravity particulate removal system as recited in claim 12 where said lower surface of said first planar member and said upper surface of said second planar member are wetted by a liquid to aid supersaturation of said substantially saturated particulate laden gas within said gas flow channel.

15. The phoretic enhanced-gravity particulate removal system as recited in claim 14 including means for maintaining a temperature difference between said lower surface of said first planar member and said upper surface of said second planar member.

16. The phoretic enhanced-gravity particulate removal system as recited in claim 12 including means for applying phoretic forces to said substantially saturated particulate laden gas within said gas flow channel.

17. The phoretic enhanced-gravity particulate removal system as recited in claim 16 where said means for applying phoretic forces includes means for maintaining a predetermined temeprature gradient between said lower surface of said first planar member and upper surface of said second planar member.

18. The phoretic enhanced-gravity particulate removal system as recited in claim 17 where said means for applying phoretic forces includes means for wetting said lower surface of said first planar member and said upper surface of said second planar member.

19. The phoretic enhanced-gravity particulate removal system as recited in claim 18 where said means for wetting includes at least one of said first and second planar members being at least partially porous for coupling to a liquid supply.

20. The phoretic enhanced-gravity particulate removal system as recited in claim 17 where said means for maintaining said predetermined temperature gradient includes thermoelectric temperature control means secured within said first and second planar members for maintaining a respective upper surface temperature less than a respective lower surface.

21. The phoretic enhanced-gravity particulate removal system as recited in claim 20 where said growing particles are forced to said capturing means by (1) gravity assist applied to said growing particles, and (2) phoretic forces applied to said growing particles.

22. The phoretic enhanced-gravity particulate removal system as recited in claim 12 where said means for capturing said nucleated particles includes means for removing said nucleated particles from said housing.

23. The phoretic enhanced-gravity particulate removal system as recited in claim 22 where said means for removing said nucleated particles includes conveyor means displaceable in a direction substantially normal said gas flow direction and in a plane substantially parallel said gas flow direction.

24. The phoretic enhanced-gravity particulate removal system as recited in claim 23 where said conveyor means is formed of a sheet of fabric material for adherence of said nucleated particles.

25. The phoretic enhanced-gravity particulate removal system as recited in claim 23 where said conveyor means is formed of an endless sheet.

26. The phoretic enhanced-gravity particulate removal system as recited in claim 23 where said conveyor means is displaceable adjacent said upper surface of each of said planar members.

* * * * *